UNITED STATES PATENT OFFICE.

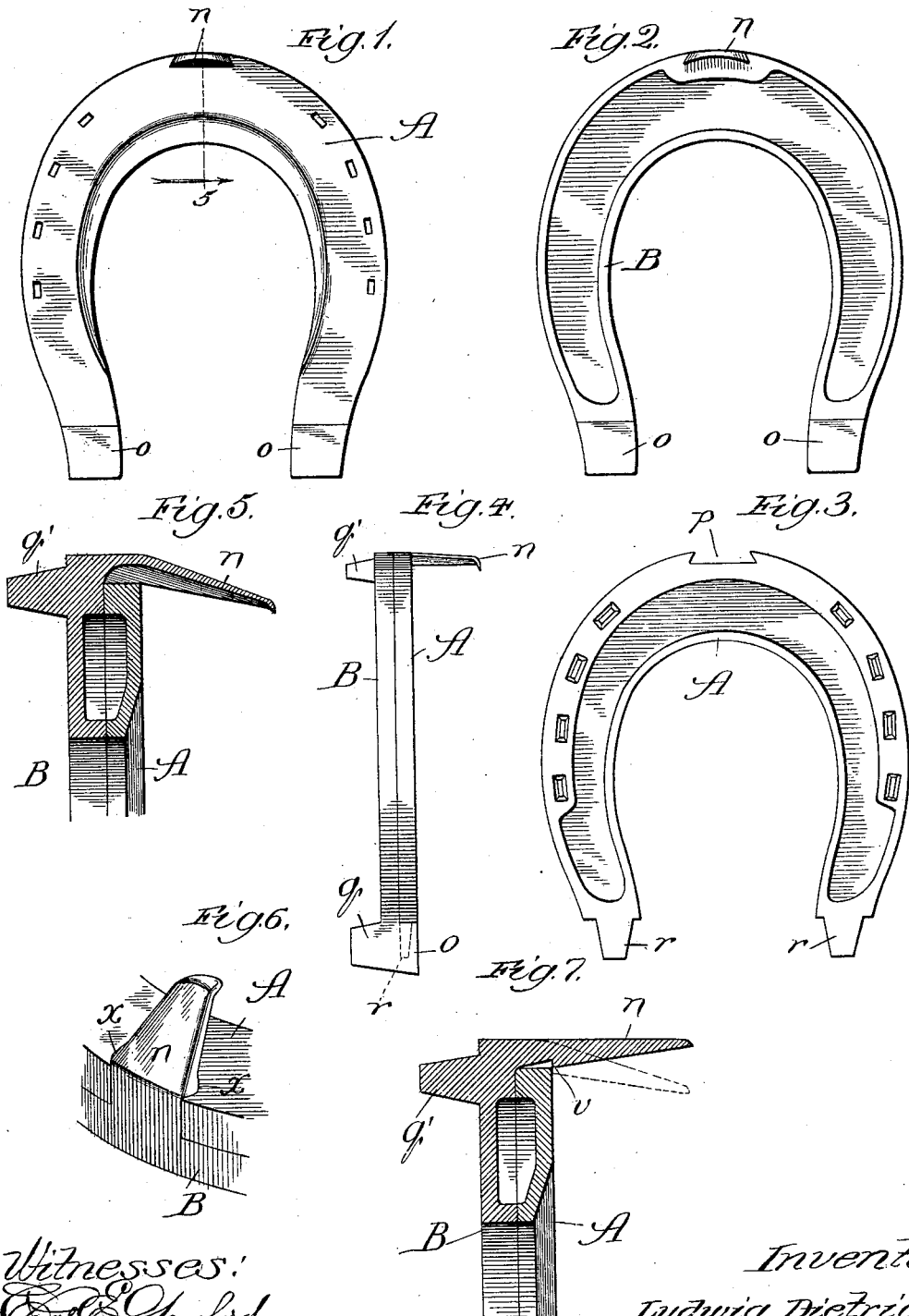

LUDWIG DIETRICH, OF CHICAGO, ILLINOIS, ASSIGNOR TO BENJAMIN HYDE, OF SAME PLACE.

TWO-PART HORSESHOE.

SPECIFICATION forming part of Letters Patent No. 599,958, dated March 1, 1898.

Application filed June 14, 1897. Serial No. 640,703. (No model.)

*To all whom it may concern:*

Be it known that I, LUDWIG DIETRICH, a citizen of the United States, residing at Chicago, in the county of Cook and State of Illinois, have invented a new and useful Improvement in Horseshoes, of which the following is a specification.

My invention relates to an improvement in the class of two-part horseshoes of the variety shown and described in Letters Patent of the United States No. 501,562, granted to me July 18, 1893. The horseshoe referred to involves two members, each of general horseshoe shape, one of which is adapted to be permanently fastened on the animal's hoof, as by nailing, the other being adapted to be removably fastened to the first to enable it to be readily taken off when worn out or for other reasons and as readily replaced by another member.

The object of my present improvement is to dispense with the pin or any separate medium for fastening together the two members at the toe portion of the horseshoe and substitute therefor an adjustable fastening, more convenient and desirable in every way, integral with the horseshoe.

Referring to the accompanying drawings, Figure 1 is a top plan view of my improved horseshoe; Fig. 2, a similar view of the lower or removable member; Fig. 3, a bottom plan view of the upper member or that adapted to be nailed to the hoof; Fig. 4, an edge view of the complete horseshoe; Fig. 5, a section taken at the line 5 on Fig. 1 and viewed in the direction of the arrow; Fig. 6, a broken perspective view showing the feature of my improvement in its preferred form; and Fig. 7, a view like that presented by Fig. 5, showing a modification.

A and B are the two horseshoe members, each being of the general shape of a horseshoe. The member A is the permanently-fastened member or that which is nailed to the hoof of the animal. It is shown to be provided at its heel ends with tongues $r\ r$ for a purpose hereinafter described; and it is provided in or near its toe portion, in the edge thereof—by preference the outer edge, as shown—with a recess $p$, the more desirable shape of which is dovetailed, as represented.

The member B is the removable or interchangeable member, which may or may not be provided with heel-calks $q$ and toe-calks $q'$, but which, if provided, may be either blunt or sharp, according to the use of the shoe. On the upper surface of the member B, at the heel ends thereof, there are shown to be provided sockets $o\ o$ to receive the tongues $r$ on the ends of the member A in adjusting thereon the member B, as hereinafter described.

On the toe portion of the member B there is formed, to project upward from its edge to coincide with the recess $p$, a "key" $n$ or clip of flexible metal, such as steel or wrought or malleable iron, preferably of the tapering form shown, though it need not be so long as it is represented to be, but must be sufficiently long to reach beyond the upper surface of the member A, and which may be concaved longitudinally on its rear or inner surface, for a purpose hereinafter explained.

To apply my improved horseshoe, the member A is fastened, as by nailing, to the animal's hoof, and the member B is adjusted thereon by slipping the sockets $o$ over the tongues $r$ and the key $n$, which should fit the recess $p$, into the latter, when the key is bent backward over the front of the hoof. Owing to the concavity in the rear side of the key $n$, bending it in the manner described tends to buckle it outward at its edges, as indicated at $x\ x$ in Fig. 6, and thereby spread the edges over those of the recess to fasten the key therein. The same purpose may be effected, however, by providing a shoulder $v$ in suitable position on the rear side of the key, near its base, to lap over the rear edge of the recess in the member A when the key is bent and thus bind that member to the lower member. Obviously, to remove the member B it is only necessary to straighten the key $n$ by bending it back, when the removable member may be easily pried off at the toe and slipped off at the tongues $r$.

The means shown and described for connecting the members A and B at their heel portions and consisting of the sockets and tongues are not essential for use in connection with the described means for fastening them at their toe portions, which may be used with any other suitable means of fastening at the heel portions, nor is it necessary, according to my invention, that the fastener $n$ shall be provided on the outer edge of the horseshoe, as it may be provided for its purpose on the inner edge thereof.

What I claim as new, and desire to secure by Letters Patent, is—

1. In a two-part horseshoe, the combination of the members A and B provided with means for mutually interlocking them at their heel portions, a recess $p$ in the member A, and a key $n$ projecting from the member B to coincide with and pass through and beyond said recess, said key being of flexible metal bendable over the member A to fasten it to the companion member and directly engage the hoof and bendable in the opposite direction to release said member B and permit its withdrawal, substantially as described.

2. In a two-part horseshoe, the combination of the member A provided with tongues at its heel portions and a recess $p$, and the member B provided with sockets at its heel portions to receive said tongues, and a key $n$ of flexible metal adapted to pass through and beyond said recess and bendable over the member A to fasten it to the companion member and directly engage the hoof and bendable in the opposite direction to release said member B and permit its withdrawal, substantially as described.

3. In a horseshoe comprising two members A and B provided with means for mutually interlocking them at their heel portions, locking means for the members between said heel portions, comprising a recess in the member A, and a key of flexible metal on the member B, having a concavity in its rear side and adapted to pass through and beyond said recess and be bent to secure it against withdrawal, substantially as described.

4. In a two-part horseshoe, the combination of the members A and B provided with means for mutually interlocking them at their heel portions, a recess $p$ in the member A, and a key $n$ projecting from the member B to coincide with and pass through and beyond said recess and provided with a projection, said key being of flexible metal bendable over the member A to bring the projection into engagement with the companion member and to directly engage the hoof and bendable in the opposite direction to release said member B and permit its withdrawal, substantially as described.

LUDWIG DIETRICH.

In presence of—
R. T. SPENCER,
W. H. DYRENFORTH.